UNITED STATES PATENT OFFICE.

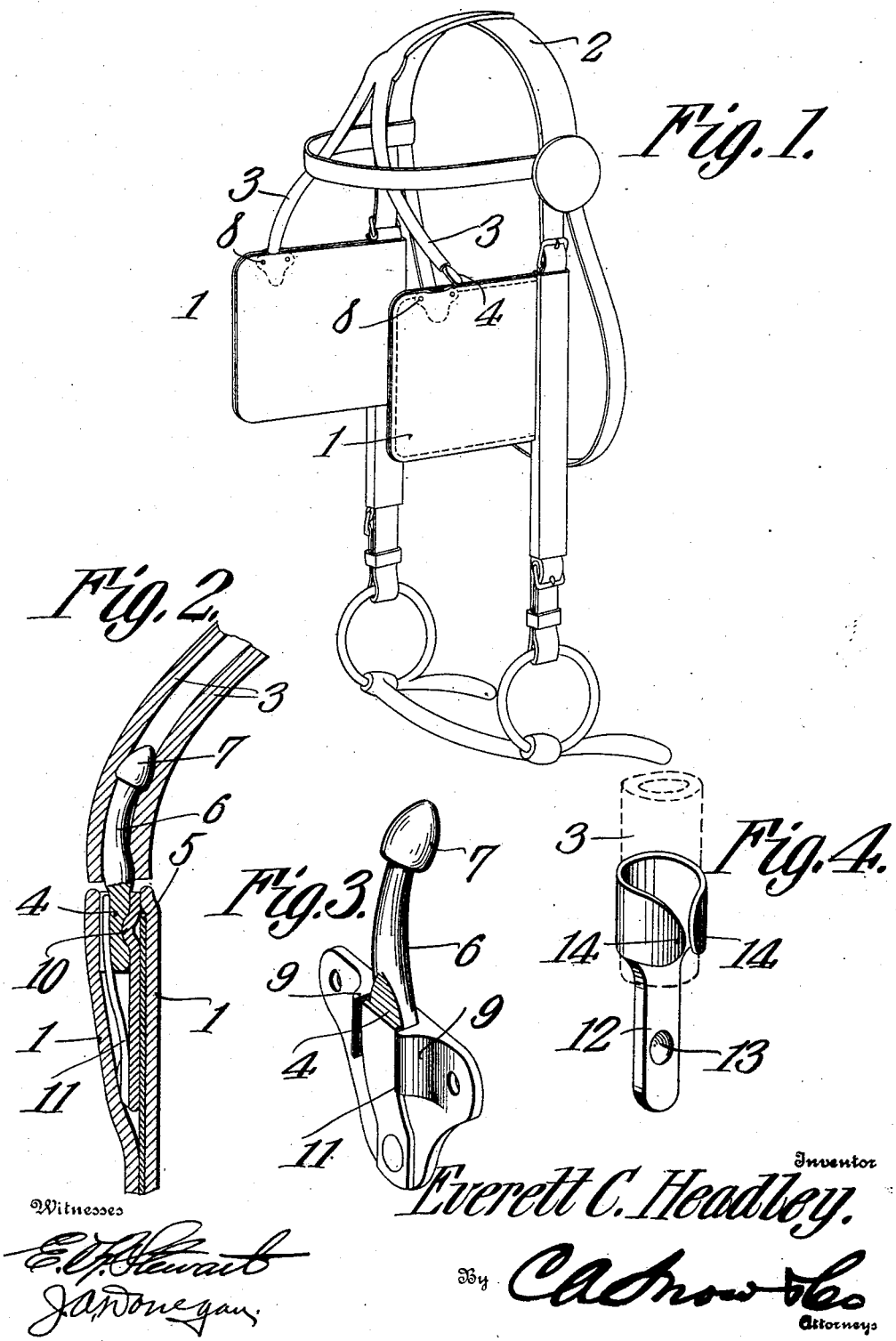

EVERETT C. HEADLEY, OF DUNNELL, MINNESOTA.

WINKER-BRACE FASTENER.

No. 912,313.     Specification of Letters Patent.     Patented Feb. 16, 1909.

Application filed March 25, 1908. Serial No. 423,214.

*To all whom it may concern:*

Be it known that I, EVERETT C. HEADLEY, a citizen of the United States, residing at Dunnell, in the county of Martin and State of Minnesota, have invented a new and useful Winker-Brace Fastener, of which the following is a specification.

This invention relates to an improved device for connecting the supporting straps of winkers in a set of harness.

It is well known that winkers are more or less subjected to severe tugging caused by the animal rubbing his head against a post or tree to which he may be tied, and it frequently happens that the frail straps which support these winkers are broken. The present invention aims to remedy this defect by employing a connection between the strap and winker adapted to support the ordinary weight of the winker in its normal horizontal position, and will give way when the latter is subjected to a heavy strain, such as when the animal rubs it against the post or tree to which it may be tied.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawing:—Figure 1 is a perspective view of a bridle showing the device applied thereto. Fig. 2 is a longitudinal sectional view showing the manner of securing the parts to the bridle. Fig. 3 is a detailed perspective view of the device. Fig. 4 is a modified form of the detaching member adapted for use in old harness.

In the construction illustrated in Fig. 1, a bridle of the ordinary type is shown having the winker blinds 1 connected to the head piece 2 by the winker straps 3. A locking member, preferably formed of a single piece of metal or other suitable material is provided at one end with a flattened portion 4, and the said flattened portion is intermediately provided with a seat 5, the function of which will presently appear. The locking member is intermediately provided with a slightly curved cylindrical shank 6 terminating in an enlarged head 7 of approximately conical shape. The shank 6 and head 7 of the locking member are adapted to be inserted in the free end of the tubular winker straps 3 and suitably secured therein. A keeper in the present instance is shown as a flat metallic disk of approximate triangular shape, interposed between the opposed faces of the winkers 1 and suitably secured to the same as by rivets or bolts 8. The keeper is centrally provided with a teat or boss 10 of a size sufficient to snugly fit in the seat 5 formed in the locking member. Flanking either side of the teat or boss 10 are lugs 9 and the space between these lugs is sufficient to permit the flat portion 4 of the locking member to be inserted therein. A leaf spring 11 having one end riveted or otherwise secured to one end of the keeper and diametrically opposite the space formed by the lugs 9 is of a length sufficient to extend into the space and normally bear on the teat or boss 10. It is obvious from the foregoing that when the flat portion 4 of the locking member is inserted between the lugs 9 and against the action of the spring 11, the latter will yieldingly hold the parts in place, as shown in Figs. 2 and 3.

A modified form of locking member is illustrated in Fig. 4, wherein the metallic plate 12 is centrally provided with a seat 13, the function of which is the same as the seat 5 formed in the locking member already described. The upper end of the plate is provided with inwardly curved walls 14 adapted to embrace a winker strap, as shown by dotted lines in Fig. 4. This construction is intended for use with old harness, such as when an old bridle is to be fitted with this device.

What is claimed is:

1. A winker brace fastener embodying a keeper, and a locking member having a cylindrical portion on one end and a flattened portion on the opposed end provided with a seat adapted to be yieldingly held by said keeper.

2. A winker brace fastener embodying a locking member having an intermediate shank portion terminating at one end in a conical head, and having a flattened portion on the opposed end provided with a transverse seat, a keeper having a teat and a member adapted to yieldingly hold said teat in engagement with said seat.

3. A winker brace fastener embodying a keeper centrally provided with a teat, and lugs flanking either side thereof, a locking member provided with a cylindrical portion on one end and a flattened portion on the opposed end having a transverse seat adapted to fit between said lugs, a spring having one end secured to said keeper and its opposite end adapted to enter between said lugs and bear on said locking member serving to hold the latter in engagement with said teat.

In testimony that I claim the foregoing as my own, I have hereto affixed my signature in the presence of two witnesses.

EVERETT C. HEADLEY.

Witnesses:
G. W. GRUNELL,
FRANK A. SANDIN.